United States Patent [19]

Kasai et al.

[11] Patent Number: 4,911,880
[45] Date of Patent: Mar. 27, 1990

[54] NUCLEAR REACTOR HAVING A UNITARY PRESSURE CONTAINER STRUCTURE

[75] Inventors: Yoshimitsu Kasai, Kodaira; Masashi Takiyama, Saitama, both of Japan

[73] Assignee: Doryokuro Kakunenryo Kaihatsu Jigyodan, Tokyo, Japan

[21] Appl. No.: 254,084

[22] Filed: Oct. 6, 1988

[30] Foreign Application Priority Data

Oct. 19, 1987 [JP] Japan ................. 62-263110

[51] Int. Cl.$^4$ .................. G21C 1/10; G21C 13/00
[52] U.S. Cl. ..................... 376/371; 376/294; 376/366; 376/374
[58] Field of Search ........... 376/366, 371, 369, 370, 376/374, 294, 406

[56] References Cited

U.S. PATENT DOCUMENTS

| | | | |
|---|---|---|---|
| 2,938,845 | 5/1960 | Treshow | 376/374 |
| 3,012,547 | 12/1961 | Ostergaard et al. | 376/370 |
| 3,182,001 | 5/1965 | Kumpf | 376/294 |
| 3,284,310 | 11/1966 | Straat | 376/370 |
| 3,371,016 | 2/1968 | Tower et al. | 376/374 |
| 3,375,171 | 3/1968 | Hannerz | 376/374 |
| 3,414,473 | 12/1968 | Schluderberg et al. | 376/370 |
| 3,509,023 | 4/1970 | Williams | 376/406 |
| 3,607,633 | 9/1971 | Fajeau | 376/406 |
| 3,713,971 | 1/1973 | Van Santen et al. | 376/370 |
| 3,723,247 | 3/1973 | Leine et al. | 376/370 |

FOREIGN PATENT DOCUMENTS 1088898 10/1967 United Kingdom.

Primary Examiner—Harvey E. Behrend
Attorney, Agent, or Firm—Wenderoth, Lind & Ponack

[57] ABSTRACT

The improvement in a nuclear reactor having a calandria tank containing moderator and a plurality of coolant flow channels which penetrate through the calandria tank and are loaded with fuel assemblies, the moderator and the coolant being isolated from each other. The improvement is constituted by a pressure container surrounding the outside of the calandria tank, a gap between the calandria tank and the pressure container being charged with the coolant; a recirculation pump for recirculating the coolant through the coolant flow channels; and a steam separator which is positioned inside the pressure container and separates the coolant flowing through the coolant flow channels into steam and water; whereby an improved nuclear reactor having a unitary pressure container structure is constructed.

8 Claims, 3 Drawing Sheets

NUCLEAR REACTOR HAVING A UNITARY PRESSURE CONTAINER STRUCTURE

BACKGROUND OF THE INVENTION

The present invention relates generally to an improvement of a nuclear reactor in which a moderator and a coolant are isolated from each other by using a calandria tank.

More particularly, it relates to a nuclear reactor having a structure in which a calandria tank containing a moderator is surrounded by a pressure container containing a coolant to thereby isolate the coolant from the moderator, the coolant in the pressure container is recirculated by a recirculation pump attached to the pressure container, and steam and water are separated in the pressure container.

A nuclear reactor in which a moderator and a coolant are separated from each other can be represented by a heavy-water-moderated boiling-light water-cooled pressure tube type reactor which uses heavy water as a moderator and light water as a coolant.

The conventional pressure tube type nuclear reactor of this type has a nuclear reactor structure in which, as shown in FIG. 3, a number of pressure tubes 14 penetrate through a calandria tank 12 that contains heavy water 10, each of the pressure tubes 14 contains therein a fuel assembly 16, and the calandria tank 12 is placed in an iron/water radiation shielding 18.

Around the nuclear reactor are arranged inlet tubes 20 for supplying a coolant into pressure tubes 14, outlet tubes 25 for guiding the coolant (two-phase fluid consisting of steam and water) boiled in the pressure tubes 14 into steam drums 22 in which steam is separated from water, recirculation pumps 24 for recirculating the separated water, and downcomer 26 for guiding the separated water from the steam drums 22 to lower headers 28.

Light water of a lower temperature and low pressure is allowed to flow through a gap between the calandria tank 12 and the iron/water radiation shielding 18 to effect the cooling. The coolant (light water) at a high temperature and high pressure that flows through the pressure tubes 14 is in a separate system. By means of the recirculation pump 24 in this system, the coolant recirculates through a path consisting of lower header 28→inlet tube 20→pressure tube 14→outlet tube 25→steam drum 22→downcomer 26→recirculation pump 24→lower header 28. Further, the heavy water 10 which serves as a moderator is separate from the above two systems; i.e., the heavy water at a low temperature and low pressure flows through the calandria tank 12 to effect the cooling.

The nuclear reactor of the above-described pressure tube type has advantages in that it is a heavy water reactor exhibiting good neutron economy, that plutonium utilization characteristics are excellent, and that the fuel assembly can be exchanged during the operation of the reactor.

As described above, however, it is required to provide the iron/water radiation shielding and its cooling system, many groups of inlet tubes and outlet tubes, steam drums and headers, thereby causing the structure to become complex. Therefore, the construction of the plant requires extended periods of time.

SUMMARY OF THE INVENTION

It is therefore an object of the present invention to provide an improved nuclear reactor having a novel unitary pressure container structure which is free from the above-described disadvantages inherent in the conventional art, and which enables the constitution of the reactor to be greatly simplified yet to maintain the excellent characteristics of the conventional pressure tube type nuclear reactor.

It is further object of the present invention to provide an improved nuclear reactor having a novel unitary pressure container structure which enables a containment vessel for containing the nuclear reactor to be constructed in a small size, and which enables the plant to be fabricated in greatly reduced periods of time.

The present invention is concerned with a nuclear reactor having a calandria tank which contains therein a moderator and a plurality of coolant flow channels which penetrate through the calandria tank. Each of the coolant flow channels is loaded with a fuel assembly, and a coolant flows through the coolant flow channels. Thus, the moderator and the coolant are isolated from each other.

In order to accomplish the above-described objects, an improved nuclear reactor according to the present invention further comprises a pressure container which surrounds the outside of the calandria tank so as to leave a gap between the calandria tank and the pressure container which is charged with the coolant; a recirculation pump for recirculating the coolant in the pressure container through the coolant flow channels; a steam separator which is positioned inside the pressure container and separates the coolant flowing through the coolant flow channels into steam and water; a main steam pipe which is provided at the upper portion of the pressure container and guides the steam separated by the steam separator outside the pressure container; and a feed water pipe provided at the pressure container. Therefore, according to the present invention, an improved nuclear reactor of a unitary pressure container structure can be constructed.

In the nuclear reactor of the present invention, the fuel assemblies are contained in the coolant flow channels in the calandria tank and are cooled by the coolant that flows through the channels. On the other hand, the coolant is heated by the fuel assemblies and boils to form a two-phase coolant consisting of steam and water that will be separated by the steam separator in the pressure container. The steam is supplied to a turbine system outside the pressure container, and the separated water is recirculated in the pressure container. The steam used in the turbine turns into water and is returned again into the pressure container. The water coolant in the pressure container is driven by the recirculation pump and is circulated to pass through the flow channels.

Particularly in the present invention, the steam separator is incorporated in the pressure container without using any complex inlet and outlet tubes or downcomer tubes or even headers that were required in the conventional art.

DETAILED DESCRIPTION OF THE PREFERRED EMBODIMENTS

Figure 1:
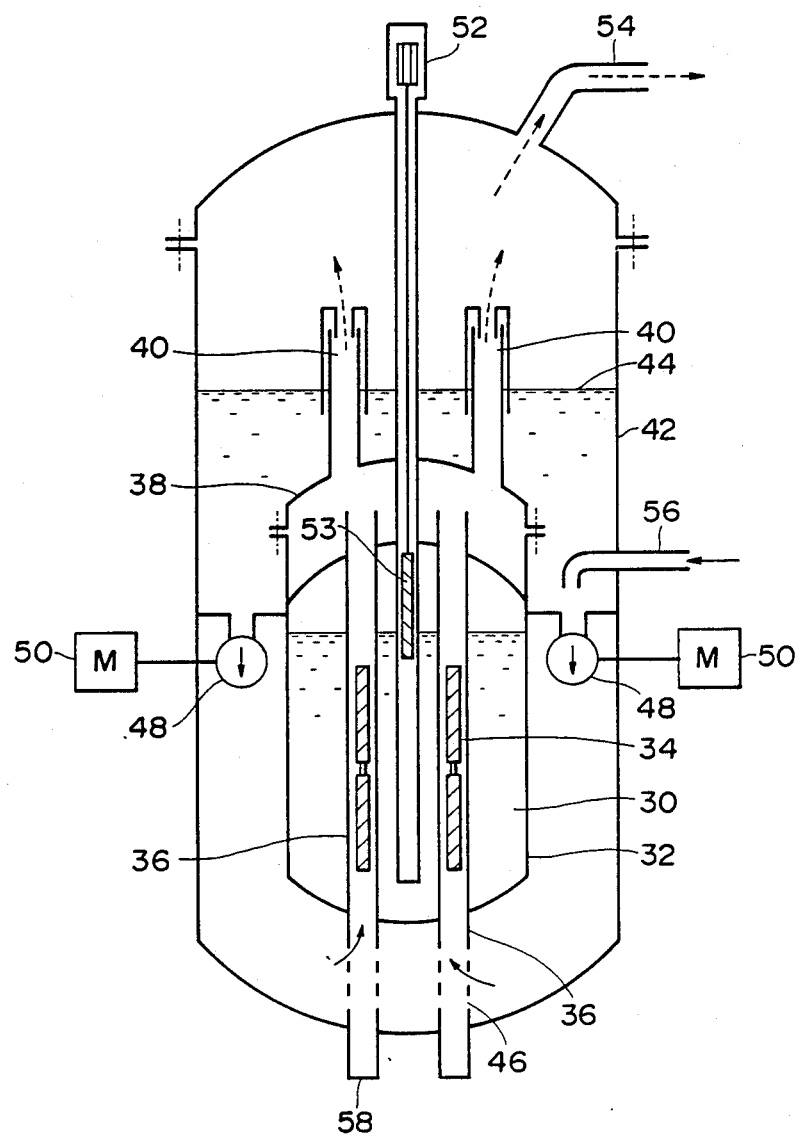
FIG. 1 is an explanatory view schematically showing a nuclear reactor of a unitary pressure container structure according to an embodiment of the present invention.

FIG. 1 schematically illustrates a nuclear reactor having a unitary pressure container structure according to an embodiment of the present invention. The nuclear reactor comprises a calandria tank 32 which contains a moderator (heavy water) 30 and a plurality of coolant flow channels which vertically penetrate through the calandria tank 32 and which are loaded with fuel assemblies 34, the moderator in the calandria tank 32 and the coolant flowing through the coolant flow channels being thus isolated from each other. Similar to the conventional art, the coolant flow channels may be constituted by pressure tubes 36 that penetrate through calandria tubes vertically provided in the calandria tank 32.

The upper portion of the calandria tank 32 is covered with a baffle plate 38 and steam separators 40 are mounted thereon. The upper end of the pressure tubes 36 are open into in a region between the baffle plate 38 and the upper plate of the calandria tank 32.

The calandria tank 32 and the above-described accessories thereof as a whole are surrounded by a pressure container 42. The coolant (light water) 44 is charged in the pressure container 42 up to a position slightly lower than the upper level of the steam separator 40. The lower portion of the pressure tube 36 extends to penetrate through the calandria tank 32. Inlet openings 46 are formed in the lower portion of the pressure tube 32 at positions to come into contact with the coolant, so that the coolant in the pressure container 42 is allowed to flow freely into the pressure tube 36.

The pressure container 42 is further provided at the upper portion thereof with a main steam pipe 54 and at the middle portion thereof with a feed water pipe 56.

Furthermore, in the nuclear reactor of this embodiment, recirculation pumps 48 are installed in the pressure container 42, and the coolant in the upper side is driven toward the lower side by drive motors 50. Reference numeral 52 denotes means for driving a control rod 53.

The thus constituted nuclear reactor operates as described hereinbelow. The coolant enters from the lower portion of the pressure container 42 into the pressure tubes 36 through inlet openings 46 as indicated by solid line arrows. The coolant is heated by the fuel assemblies 34 as it passes through the pressure tubes 36, and ascends as a two-phase stream consisting of steam and water. The stream reaches the steam separators 40 beyond the baffle plate 38 and is separated into steam and water. The steam that is separated is sent from the pressure container 42 into a turbine system (not shown) through the main steam pipe 54 as indicated by broken line arrows. The steam used in the turbine system turns into water and is returned into the pressure container 42 through the feed water pipe 56.

On the other hand, the water separated by the steam separators 40 is returned into the pressure container 42. The water coolant in the pressure container 42 is pressurized by the recirculation pumps 48 to flow down through a gap between the calandria tank 32 and the pressure container 42, and is returned to the lower portion of the pressure container 42. The coolant circulates through the abovedescribed path.

Further, though not illustrated, the moderator in the calandria tank 32 flows out of the calandria tank 32, is cooled through an external heat exchanger (the heat is recovered by feed water), and returns to the calandria tank 32. The pressure of the moderator in the calandria tank 32 is maintained to be equal to the pressure of the coolant in the nuclear reactor by adjusting the pressure of a cover gas (e.g., helium gas).

In the nuclear reactor of the present invention as described above, the heat energy generated from the fuel assemblies is transformed into the steam and is taken out to an external unit to drive a turbine.

According to this embodiment, the lower end of the pressure tube 36 extends to penetrate through the pressure container 42 and is provided with a nozzle 58 for refueling. Being constituted in this way, the fuel in the nuclear reactor can be exchanged through the nozzle at the lower part of the nuclear reactor during the operation of the reactor.

In FIG. 1, the control rod 53 is inserted or pulled out from the upper portion of the nuclear reactor by employing a solid control rod. It is, however, also possible to employ a liquid poison control rod or the like. When there is no need of refueling during the operation of the reactor, the refueling operation may be carried out by removing the upper covering of the pressure container 42, without providing the nozzles 58 for refueling at the lower ends of the pressure tubes 36. In this embodiment, the baffle plate 38 is installed over the calandria tank 32. The baffle plate 38, however, needs not be provided if a steam separator 40 is provided over each of the pressure tubes 36. The recirculation pumps 48 are provided in the pressure container 42. However, it is also possible to provide the recirculation pump on the outside of the pressure container 42 if a passage between the pressure container and the recirculation pump is provided for guiding the coolant.

Figure 2:
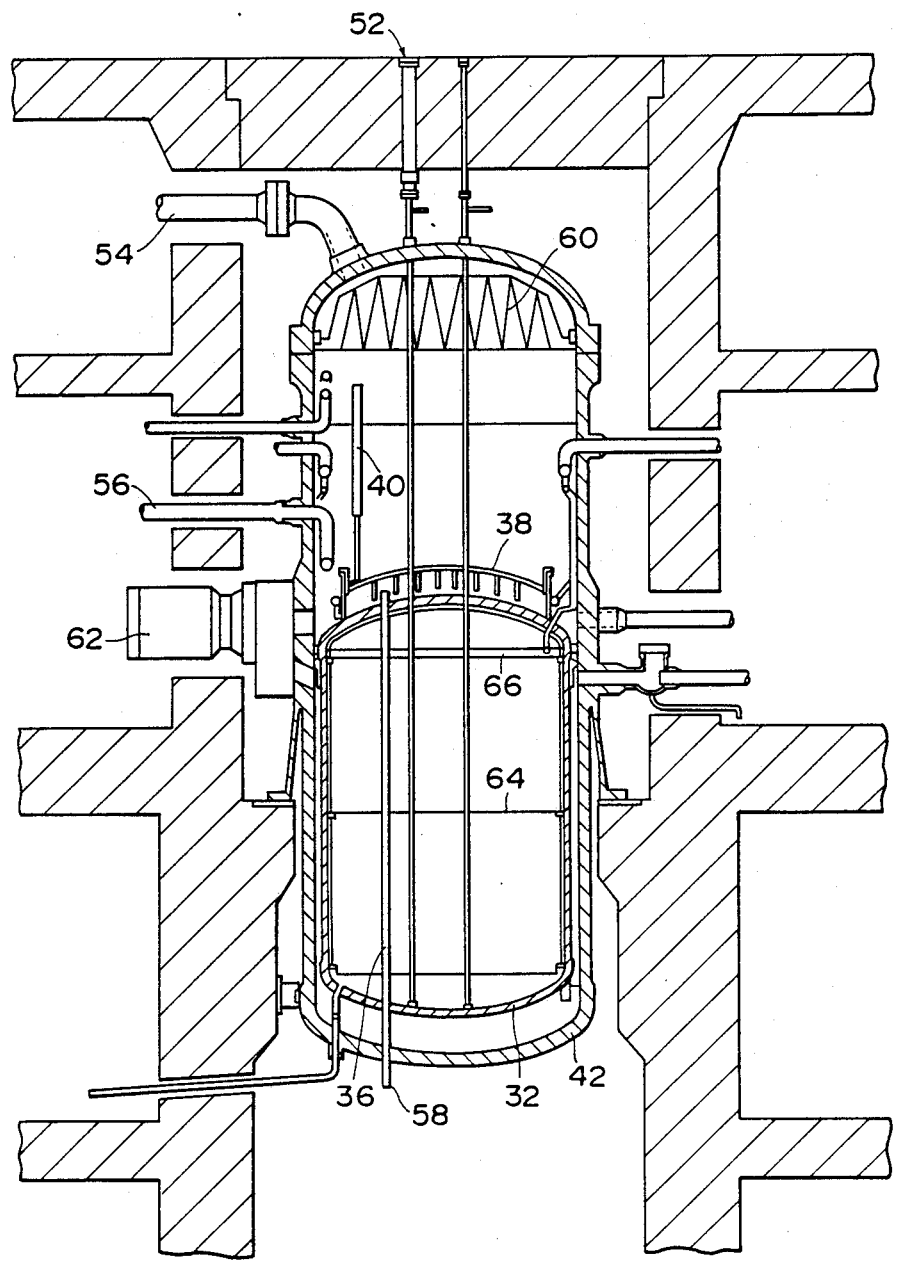
FIG. 2 is an explanatory view showing in detail another embodiment of the present invention.
Figure 3:
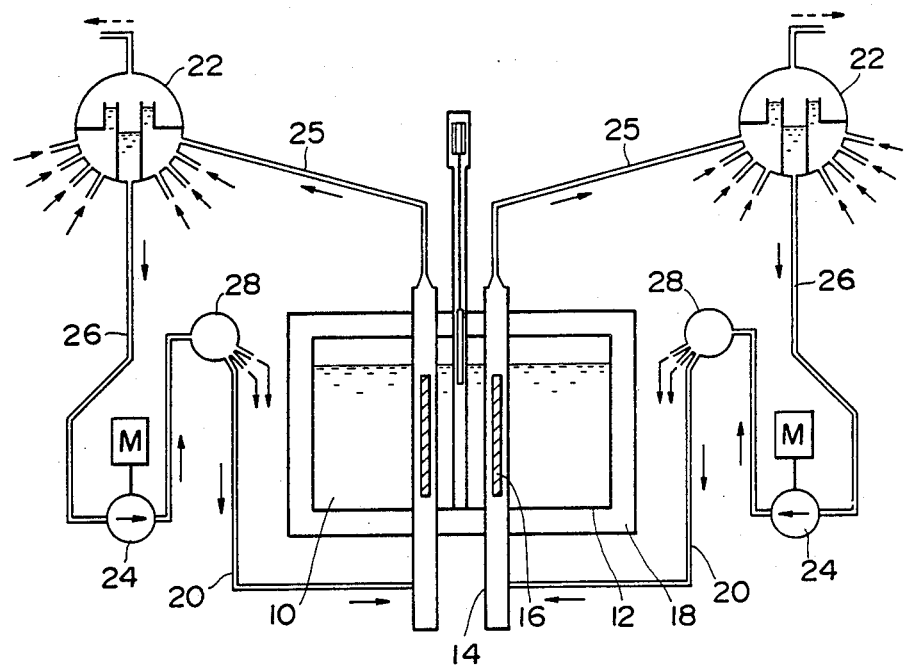
FIG. 3 is an explanatory view showing a typical conventional pressure tube type nuclear reactor.

FIG. 2 illustrates in detail a nuclear reactor according to the present invention. The fundamental structure is the same as that of the embodiment of FIG. 1. To simplify the description, therefore, like components are designated by like reference numerals and the explanation is omitted. In this embodiment, a drier 60 is provided at an upper portion in the pressure container 42. Thus, the steam produced in the steam separator 40 is dried and is guided to the main steam pipe 54. Further, a recirculation pump 62 is mounted on the outer side portion of the pressure container 42 to circulate the coolant through a flow path that penetrates through the wall of the pressure container. In practice, a vibration preventing plate 64 and a heavy water distribution plate 66 are provided as is conventional in the art.

According to the present invention as described hereinabove, the moderator and the coolant are isolated from each other by using the calandria tank to provide excellent performance from the traditional pressure tube type nuclear reactors.

Additionally, in the nuclear reactor of the present invention, the outside of the calandria tank is surrounded by the pressure container, the coolant is charged in the pressure container and circulated by the recirculation pump, and the steam separator is incorporated in the pressure container to guide the steam to the outside of the pressure container. Therefore, the nuclear reactor according to the present invention requires none of the conduits and equipment such as iron/water radiation shielding and its cooling system, many groups of inlet tubes and outlet tubes, steam drums and headers, that have heretofore been needed in the conventional pressure tube type nuclear reactors. As a result, the structure is greatly simplified, and a containment vessel for containing the nuclear reactor can be constructed in a small size.

Since the complex conduit system can be eliminated as described above, and further the pressure tubes are mounted within the calandria tank in the factory and the resulting calandria tank assembly is installed in the pressure container on the site, it becomes possible to construct the plant in greatly reduced periods of time.

Furthermore, the heat (about 5% of the reactor output) generated in the heavy water is recovered by feed water or is transmitted to the coolant, making it possible to increase the heat efficiency of the plant. To the pressure tube is applied only a difference in pressure between the coolant and the moderator, contributing to reducing the stress during the operation of the reactor. Even if damage may occur in the pressure tubes, the pressure is equalized between the coolant and the moderator, so that strict design requirements are not required for the pressure tubes.

What is claimed is:

1. A nuclear reactor comprising:
   a completely closed calandria tank containing therein a moderator constituted by heavy water and having a plurality of vertically extending pressure tubes extending completely through said calandria tank and having the portions thereof within said calandria tank imperforate, each of said pressure tubes being loaded with a fuel assembly;
   a moderator circulating system connected to said calandria tank for circulating moderator only from said tank;
   a coolant constituted by light water flowing through said pressure tubes from the lower portion to the upper portion thereof and being isolated from the moderator;
   a pressure container surrounding the outside of said calandria tank and spaced therefrom to leave a gap between said calandria tank and said pressure container, said gap having the coolant therein, said pressure container further having a removable lid, the lower end of each pressure tube extending through said pressure container and being provided with a nozzle for refueling;
   a recirculation pump means for recirculating the coolant in said pressure container through said pressure tubes;
   a steam separator means positioned inside said pressure container substantially centrally thereof for separating the coolant flowing through said pressure tubes into steam and light water;
   a main steam pipe at the upper portion of said pressure container for guiding the steam separated by said steam separator means out of said pressure container; and
   a feed water pipe extending into said pressure container.

2. A nuclear reactor as claimed in claim 1 in which the lower portion of each of said pressure tubes extends below said calandria tank and has a plurality of openings therein at positions in contact with said coolant so that the coolant in said pressure container flows freely into said pressure tube, and said recirculation pump means is operable for drawing the coolant in said pressure container to flow toward the lower portion of said pressure container.

3. A nuclear reactor as claimed in claim 1 further comprising a baffle plate covering the upper portion of said calandria tank, and said steam separator means is mounted on said baffle plate, the upper end of each of said pressure tubes opening into a region between said baffle plate and the upper portion of said calandria tank.

4. A nuclear reactor as claimed in claim 3 in which said coolant is present in said pressure container up to a level slightly lower than the upper end of said steam separator means.

5. A nuclear reactor as claimed in claim 1 in which said recirculation pump means is inside said pressure container.

6. A nuclear reactor as claimed in claim 1 in which said recirculation pump means is outside said pressure container, and said pressure container has a passage to said recirculation pump means through which the coolant flows.

7. A nuclear reactor as claimed in claim 1 in which said recirculation pump means comprises a plurality of recirculating pumps.

8. A nuclear reactor as claimed in claim 1 in which said steam separator means comprises a plurality of steam separators.

* * * * *